Feb. 22, 1966 S. A. WERTEPNY 3,235,968
LENGTH GAUGE
Filed May 20, 1963
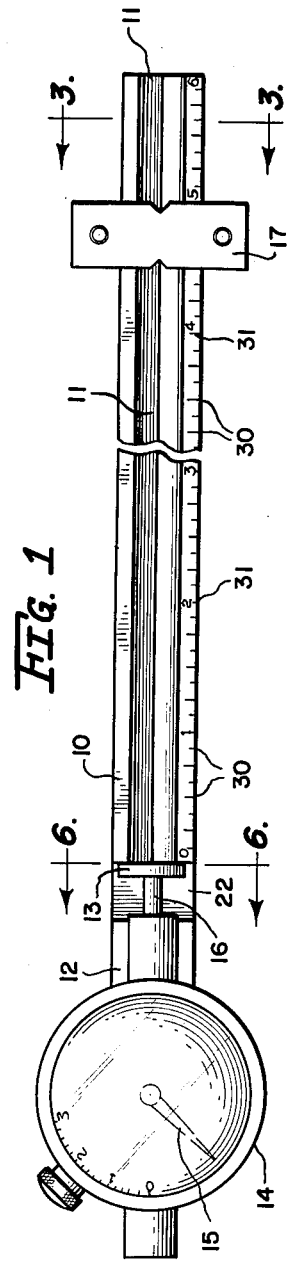
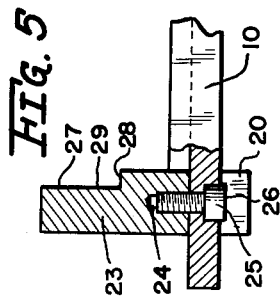
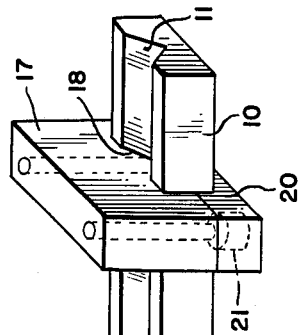
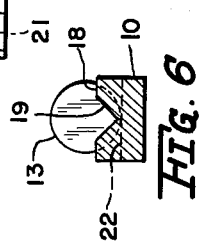
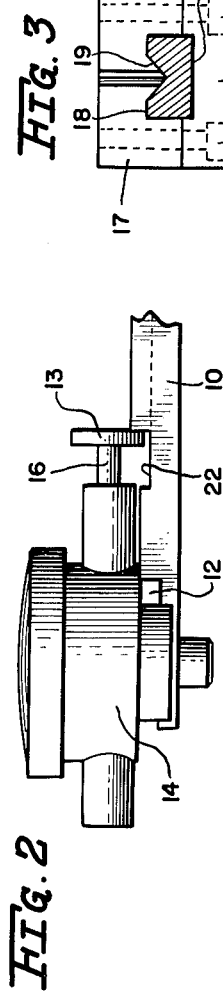
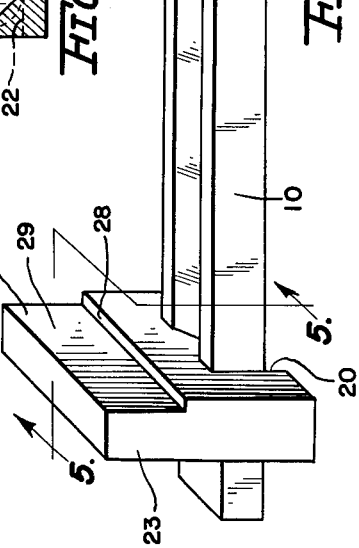
INVENTOR.
Stanley Wertepny
BY John J. Brezina
Attorney

United States Patent Office 3,235,968
Patented Feb. 22, 1966

3,235,968
LENGTH GAUGE
Stanley A. Wertepny, 73 Hamilton Ave., Bensenville, Ill.
Filed May 20, 1963, Ser. No. 281,418
3 Claims. (Cl. 33—147)

This invention is directed to a novel measuring gauge adapted for use in measuring and in checking the dimensions of solid articles, work pieces and products of various types, for the purpose of testing the accuracy of the production of such articles and products.

In modern production methods, various types of gauges have been employed to measure the size and dimension of products produced and which have been relatively complex and cumbersome and expensive.

Objects of my invention are:

To produce a novel portable and relatively light measuring gauge for checking the dimensions of manufactured articles or work pieces, and which includes an elongated longitudinal grooved metal bar having a pressure gauge or indicator mounted upon one end thereof with a work-engaging depressible element thereon, and having adjustably secured upon its opposite end portion a block means comprising two or more co-operating blocks which are slidable along said bar and releasably secured by suitable screw means.

To provide a novel gauge for measuring elongated rigid articles which has a metal bar having a longitudinal work-receiving groove therein and an adjustably mounted block or stop means on one end portion of said bar, and a pair of co-acting blocks adjustably mountable along portions of said bar, said first mentioned block having an inwardly facing recess terminating shoulder.

To provide a portable gauge capable of being economically manufactured and quickly adjusted and used.

Other and further important objects of my invention will be apparent from the following description and appended claims.

On the drawings:

FIG. 1 is a top plan view, with parts broken away, of my novel gauge;

FIG. 2 is a side elevational view thereof looking at the left hand portion of FIG. 1;

FIG. 3 is a partially cross sectional view taken on a plane indicated by line 3—3 of FIG. 1;

FIG. 4 is a perspective view of a modified form of my adjustable gauge embodying substantially similar structural features;

FIG. 5 is a cross sectional view taken on a vertical plane indicated by line 5—5 of FIG. 4; and FIG. 6 is a cross sectional view taken on line 6—6 of FIG. 1.

As shown on the drawings:

Referring to the drawings, numeral 10 designates an elongated bar of steel or equivalent metal which has formed therein a longitudinal extending groove 11 which is preferably of V shape and opening normally upwardly. As shown in FIG. 2, the end portion of said bar 10 is reduced to provide an end portion 12 which is suitably slotted or apertured and which has mounted thereon a suitable indicating and measuring gauge 14, which is illustrated in FIGS. 1 and 2 only diagrammatically and is adjustably secured by a screw relative to the slot in the apertured end portion 12. Said gauge has a dial with indicia thereon (not shown), and an indicating pointer 15 which is operatively connected in the usual manner to be moved by a spring-pressed slidable plunger 16 which has an integral head 13 and which is disposed partially in said groove 11, as indicated in FIG. 1.

It will be understood that said gauge 14 is of the known type having spring means therein which normally hold the projecting portion of the plunger 16 in outer projected position.

An upwardly opening transverse slot 22 is formed in bar 10 in which the head 13 of plunger 16 is positioned so that the end face of said head contacts the end faces partially defining the slot 22 and which is the zero position of the plunger 16 and of said gauge. This provides for the gauge to remain in zero starting position when plunger 16 is not pressed inward, and this eliminates the need for pre-setting of the gauge by the use of "Jo" blocks, or vernier gauge, or the like.

The upper face of bar 10 has a plurality of calibrations 30 formed thereon, either in metric or English systems, and indicating numerals 31 are formed adjacent a part of said calibrations, for example, in centimeters or the like or in sixty-fourths of an inch, to facilitate quick reading.

The adjustable means against which one end portion of the work is to be placed in normal use comprises a stop means such as a block 17 having two parallel threaded passages therein and having a recess 18 of a shape so that an integral tooth or projection 19 is formed which will slide in the longitudinal groove 11. Reference numeral 20 designates an apertured block having two passages therein, as indicated in FIG. 3, and which is recessed at its intermediate portion to normally slide along the bottom face of the bar 10. A pair of screws 21 are releasably mounted through the holes of block 20 and threaded into the threaded passages of block 17. Accordingly, said stop means is adjustably mounted so that it may be easily positioned and secured at the desired distance from the head or end face of the plunger 16, to accord with the exact length of the articles to be produced or tested.

In FIG. 4 I have illustrated a modified form of my invention in which the elongated bar has secured on one end portion thereof a recessed and shouldered member 23, shown in cross section in FIG. 5. Said member 23 has a threaded hole 24 therein and the end portion of the bar 10 has a counter-sunk hole 25 therein, and a threaded screw or pin 26 is mounted, as shown in FIG. 5, to engage the inner passage of the member 23 and secure the same against the flat face of the bar 10 so that its side face is perpendicular to the longitudinal axis of the bar 10.

Said member 23 has formed on its outer portion a transversely extending recess 27 which forms an inner flat face 29 and a shoulder 28, as indicated in FIG. 5.

Said shoulder 28 is relatively narrow, as indicated, and the flat face 29 is in a plane perpendicular to the longitudinal axis of bar 10 and is in a plane parallel to the inner face of block 17. After the blocks 17 and 20 are secured in the desired position so that the distance between the inner face thereof and the inner face 29 of the member 23, is equal to the desired length of the pieces to be measured, the user will be able to insert rigid work pieces between the inner face of block 17 and the inner face 29 of member 23.

The distance between the planes of face 29 and the inner face of the block is adapted to represent the range of tolerance or permissable variation in the length of the parts produced. If the end of the part drops below the shoulder 28 the part is too short and can be rejected. If the part cannot be moved within the inner face 29, the part is too long and can be rejected.

My said invention provides means for quickly measuring and reading the length or dimension of pieces or parts, for example, to thousandths of an inch, and a means for confirming that the pieces or parts are made within a prescribed tolerance. A further advantage is that the making of a separate gauge for each production job is eliminated.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a portable gauge, an elongated longitudinally grooved bar; said bar having a transverse recess
   a pair of complementary blocks having recesses and passages therein removably and adjustably mounted upon a portion of said bar;
   screws mounted in and removably connecting said blocks and adapted to hold said blocks in desired position; and
   a spring pressed indicating gauge mounted on one end portion of said bar and having a depressible member projecting therefrom adjacent to said bar, said depressible member being adapted to actuate said indicator to indicate the dimension of a work-piece placed between said blocks and said member, said depressable member having its outer end normally in said transverse recess.

2. A device for accurate testing the dimensions of elongated rigid articles comprising an elongated metal bar having a longitudinal groove therein;
   a block adjustably mounted on one end portion of said bar;
   screws for releasably securing said block in desired position, said bar having a transverse recess therein and having calibrations and indicia thereon;
   a spring indicating gauge secured to one end of said bar and having a depressable projecting actuable member, said member having its outer end normally in said transverse recess and in zero position, said projecting member being engageable by pieces to be measured.

3. A device for accurately testing the dimensions of elongated rigid articles comprising an elongated metal bar having a longitudinal recess therein and having graduations and indicia thereon;
   and having a transverse groove therein at the zero position of said bar;
   a pair of complementary blocks adjustably mounted on one end portion of said bar;
   screws for releasably securing said blocks together,
   an indicating gauge mounted on the other end portion of said bar, said gauge having a depressible element and a head on said element;
   said head being disposed in the path of said recess and in said groove;
   said gauge being adapted to indicate variations of dimensions of articles positioned between one of said blocks and said head.

References Cited by the Examiner

UNITED STATES PATENTS

| 202,188 | 4/1878 | Ostergard | 33—143 |
| 1,992,573 | 2/1935 | Hounsfield | 33—147 |
| 2,465,791 | 3/1949 | Daoust | 33—143 |
| 2,553,397 | 5/1951 | Ames | 33—147 |

OTHER REFERENCES

Robert Wagner: Built-up Snap Gages, Machinery, page 818, June 1925.

LOUIS R. PRINCE, *Primary Examiner.*

ISAAC LISANN, *Examiner.*